(12) United States Patent
Salman et al.

(10) Patent No.: US 11,838,402 B2
(45) Date of Patent: Dec. 5, 2023

(54) ULTRA LOW POWER CORE FOR LIGHTWEIGHT ENCRYPTION

(71) Applicant: The Research Foundation for The State University of New York, Albany, NY (US)

(72) Inventors: Emre Salman, Albany, NY (US); Milutin Stanacevic, Albany, NY (US); Yasha Karimi, Albany, NY (US); Tutu Wan, Albany, NY (US); Yuanfei Huang, Albany, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 214 days.

(21) Appl. No.: 17/438,662

(22) PCT Filed: Mar. 13, 2020

(86) PCT No.: PCT/US2020/022522
§ 371 (c)(1),
(2) Date: Sep. 13, 2021

(87) PCT Pub. No.: WO2020/186125
PCT Pub. Date: Sep. 17, 2020

(65) Prior Publication Data
US 2022/0158819 A1    May 19, 2022

Related U.S. Application Data

(60) Provisional application No. 62/817,631, filed on Mar. 13, 2019.

(51) Int. Cl.
*H04L 9/06* (2006.01)
*H04L 9/08* (2006.01)

(52) U.S. Cl.
CPC .......... *H04L 9/0625* (2013.01); *H04L 9/0819* (2013.01); *H04L 9/0618* (2013.01); *H04L 2209/24* (2013.01); *H04L 2209/805* (2013.01)

(58) Field of Classification Search
CPC . H04L 9/0625; H04L 9/0819; H04L 2209/24; H04L 9/0618; H04L 2209/805; H04K 1/00
See application file for complete search history.

(56) References Cited

U.S. PATENT DOCUMENTS

| 4,369,332 A | 1/1983 | Campbell, Jr. |
| 5,003,596 A | 3/1991 | Wood |

(Continued)

FOREIGN PATENT DOCUMENTS

| CN | 1136738 A | 11/1996 |
| CN | 1823356 A | 8/2006 |

(Continued)

OTHER PUBLICATIONS

Aysu, Aydin, Ege Berkay Gulcan and Patrick Schaumont. "SIMON Says, Break the Area Records for Symmetric Key Block Ciphers on FPGAs." 2014, IACR Cryptol. ePrint: 237, obtained from <https://eprint.iacr.org/2014/237.pdf>, retrieved on Jul. 14, 2023 (Year: 2014).*

(Continued)

*Primary Examiner* — Farid Homayounmehr
*Assistant Examiner* — Zhimei Zhu
(74) *Attorney, Agent, or Firm* — Scully, Scott, Murphy & Presser, P.C.

(57) ABSTRACT

A processing unit and a method of operating a processing unit. In an embodiment, the processing unit comprises a SIMON block cipher for transforming plaintext data into encrypted data. A key expansion module generates and outputs one or more encryption keys; and the key expansion (Continued)

module includes a first series of adiabatic registers for holding key generation data values, and for using adiabatic switching to transmit the key generation data values through the first series of adiabatic registers. A round function module receives the plaintext data and the one or more encryption keys, encrypts the plaintext data to generate the encrypted data, and outputs the encrypted data; and the round function module includes a second series of adiabatic registers for holding encryption data, and for using adiabatic switching to transmit the encryption data through the second series of adiabatic registers.

20 Claims, 10 Drawing Sheets

(56) References Cited

U.S. PATENT DOCUMENTS

| | | | |
|---|---|---|---|
| 5,003,597 | A | 3/1991 | Merkle |
| 5,195,136 | A | 3/1993 | Hardy et al. |
| 6,870,929 | B1 | 3/2005 | Greene |
| 7,174,020 | B2 | 2/2007 | Chui |
| 7,545,928 | B1 | 6/2009 | Goh |
| 7,580,519 | B1 | 8/2009 | Goh |
| 8,041,032 | B2 | 10/2011 | Katoozi et al. |
| 10,204,532 | B2 | 2/2019 | Christiansen et al. |
| 2001/0021254 | A1 | 9/2001 | Furuya et al. |
| 2001/0031050 | A1 | 10/2001 | Domstedt et al. |
| 2002/0181709 | A1 | 12/2002 | Sorimachi et al. |
| 2002/0191784 | A1 | 12/2002 | Yup et al. |
| 2003/0059054 | A1 | 3/2003 | Hu et al. |
| 2003/0072444 | A1 | 4/2003 | Hu et al. |
| 2004/0228479 | A1 | 11/2004 | Crispin et al. |
| 2004/0228483 | A1 | 11/2004 | Henry et al. |
| 2004/0252831 | A1 | 12/2004 | Uehara |
| 2006/0188098 | A1 | 8/2006 | Kumagai et al. |
| 2007/0180270 | A1 | 8/2007 | Kumagai et al. |
| 2008/0019504 | A1 | 1/2008 | Han et al. |
| 2010/0027783 | A1 | 2/2010 | Yup |
| 2010/0232602 | A1 | 9/2010 | Nobukata |
| 2015/0280909 | A1* | 10/2015 | Mathew ............... G09C 1/00 380/278 |
| 2016/0065368 | A1* | 3/2016 | Hars .................. H04L 9/3242 713/190 |
| 2016/0094552 | A1* | 3/2016 | Durham ............... G06F 21/00 713/171 |
| 2017/0034167 | A1 | 2/2017 | Figueira |
| 2018/0176011 | A1* | 6/2018 | Hars .................. H04L 9/0618 |
| 2018/0205536 | A1 | 7/2018 | Tomlinson |
| 2018/0295111 | A1 | 10/2018 | Iizuka et al. |
| 2019/0036906 | A1 | 1/2019 | Biyani et al. |
| 2020/0007340 | A1 | 1/2020 | Park et al. |
| 2020/0257792 | A1* | 8/2020 | Rivard ................ H04W 12/47 |
| 2021/0004495 | A1 | 1/2021 | Osugi |

FOREIGN PATENT DOCUMENTS

| | | |
|---|---|---|
| CN | 101114903 A | 1/2008 |
| CN | 101739889 B | 4/2012 |
| CN | 103077362 B | 9/2015 |
| CN | 104852798 B | 10/2017 |
| CN | 109150497 A | 1/2019 |
| CN | 109257161 A | 1/2019 |
| CN | 210129870 U | 3/2020 |
| CN | 111901115 A | 11/2020 |
| CN | 112329038 A | 2/2021 |
| CN | 112513856 A | 3/2021 |
| CN | 108494547 B | 4/2021 |
| DE | 100 36 372 A1 | 1/2002 |
| DE | 697 28 465 T2 | 5/2005 |
| DE | 103 45 385 B4 | 10/2005 |
| DE | 600 21 560 T2 | 5/2006 |
| DE | 10 2006 006 057 A1 | 8/2007 |
| DE | 10 2006 006 057 B4 | 12/2007 |
| DE | 10 2008 013 785 A9 | 9/2008 |
| EP | 0 002 578 B1 | 9/1982 |
| EP | 0 615 361 A1 | 9/1994 |
| EP | 1 257 082 A2 | 11/2002 |
| EP | 1 292 066 A1 | 3/2003 |
| EP | 0 801 477 B1 | 8/2003 |
| EP | 1 347 595 A1 | 9/2003 |
| EP | 1 416 664 A2 | 5/2004 |
| EP | 0 793 366 B1 | 6/2006 |
| EP | 1 629 626 B1 | 2/2008 |
| EP | 1 161 027 B1 | 4/2009 |
| JP | 6-149153 A | 5/1994 |
| JP | 6-342257 A | 12/1994 |
| JP | 8-8897 A | 1/1996 |
| JP | 8-163120 A | 6/1996 |
| JP | H09212090 A | 8/1997 |
| JP | 9-230788 A | 9/1997 |
| JP | 9-233066 A | 9/1997 |
| JP | 9233065 A | 9/1997 |
| JP | 10-22990 A | 1/1998 |
| JP | 10-74044 A | 3/1998 |
| JP | 10-508450 T2 | 8/1998 |
| JP | 10-301492 A | 11/1998 |
| JP | 11-17673 A | 1/1999 |
| JP | 11-52850 A | 2/1999 |
| JP | 11-88320 A | 3/1999 |
| JP | 11-136229 A | 5/1999 |
| JP | 2000-261423 A | 9/2000 |
| JP | 2001-16197 A | 1/2001 |
| JP | 2002-32018 A | 1/2002 |
| JP | 2002-139994 A | 5/2002 |
| JP | 2002-229444 A | 8/2002 |
| JP | 2003-288010 A | 10/2003 |
| JP | 2003-288012 A | 10/2003 |
| JP | 2003-318883 A | 11/2003 |
| JP | 2005-31471 A | 2/2005 |
| JP | 2005-134478 A | 5/2005 |
| JP | 3658004 B2 | 6/2005 |
| JP | 2005-354602 A | 12/2005 |
| JP | 2006-19872 A | 1/2006 |
| JP | 2006-340407 A | 12/2006 |
| JP | 2007-43738 A | 2/2007 |
| JP | 3904432 B2 | 4/2007 |
| JP | 2007-174024 A | 7/2007 |
| JP | 2007-184000 A | 7/2007 |
| JP | 2007-195132 A | 8/2007 |
| JP | 2007-306581 A | 11/2007 |
| JP | 2008-58831 A | 3/2008 |
| JP | 2008-61118 A | 3/2008 |
| JP | 2008-203306 A | 9/2008 |
| JP | 2009-192630 A | 8/2009 |
| JP | 4466641 B2 | 5/2010 |
| JP | 2010-246158 A | 10/2010 |
| JP | 4708914 B2 | 6/2011 |
| JP | 2012-39180 A | 2/2012 |
| JP | 5042272 B2 | 10/2012 |
| JP | 5055993 B2 | 10/2012 |
| JP | 2012-235287 A | 11/2012 |
| JP | 5198526 B2 | 5/2013 |
| JP | 5228803 B2 | 7/2013 |
| JP | 5296217 B2 | 9/2013 |
| JP | 5327493 B1 | 10/2013 |
| JP | 5431190 B2 | 3/2014 |
| JP | 2014-240921 A | 12/2014 |
| JP | 5748634 B2 | 7/2015 |
| JP | 5801095 B2 | 10/2015 |
| JP | 2015-191106 A | 11/2015 |
| JP | 5901884 B2 | 4/2016 |
| JP | 6030103 B2 | 11/2016 |
| JP | 6244429 B2 | 12/2017 |
| JP | 6287785 B2 | 3/2018 |
| JP | 2018-109750 A | 7/2018 |
| KR | 2000-0008923 A | 2/2000 |
| KR | 2002-0003579 A | 1/2002 |
| KR | 10-0377176 B1 | 3/2003 |
| KR | 10-2005-0006062 A | 1/2005 |
| KR | 10-0458339 B1 | 4/2005 |
| KR | 10-0583635 B1 | 5/2006 |

(56) References Cited

FOREIGN PATENT DOCUMENTS

| | | |
|---|---|---|
| KR | 10-0835718 B1 | 6/2008 |
| KR | 10-0836758 B1 | 6/2008 |
| KR | 10-2018-0081469 A | 7/2018 |
| MX | 2019005100 A | 8/2019 |
| WO | 90/09009 A1 | 8/1990 |
| WO | 02/101972 A2 | 12/2002 |
| WO | 03/100751 A1 | 12/2003 |
| WO | 2006022058 A1 | 3/2006 |
| WO | 2006112114 A1 | 10/2006 |
| WO | 2008/096004 A1 | 8/2008 |
| WO | 2010041264 A1 | 4/2010 |
| WO | 2012132621 A1 | 10/2012 |
| WO | 2013069392 A1 | 5/2013 |
| WO | 2013080976 A1 | 6/2013 |
| WO | 2013129054 A1 | 9/2013 |
| WO | 2013129055 A1 | 9/2013 |
| WO | 2013129056 A1 | 9/2013 |
| WO | WO-2013172790 A1 * 11/2013 ........... G06F 21/558 |
| WO | 2013190782 A1 | 12/2013 |
| WO | 2014074633 A1 | 5/2014 |
| WO | 2015146430 A1 | 10/2015 |
| WO | 2015146431 A1 | 10/2015 |
| WO | 2019122825 A1 | 6/2019 |
| WO | 2020186125 A1 | 9/2020 |

OTHER PUBLICATIONS

Jos Wetzels, Wouter Bokslag, "Simple SIMON: FPGA implementations of the SIMON 64/128 Block Cipher", 2016, Cryptology ePrint Archive, obtained from <https://eprint.iacr.org/2016/029.pdf>, retrieved on Jul. 14, 2023 (Year: 2016).*

Abed, S.; Jaffal, R.; Mohd, B.J.; Alshayeji, M. FPGA Modeling and Optimization of a SIMON Lightweight Block Cipher. Feb. 21, 2019, Sensors, 19, 913 (Year: 2019).*

T. Wan and E. Salman, "Ultra Low Power SIMON Core for Lightweight Encryption," May 27-30, 2018, 2018 IEEE International Symposium on Circuits and Systems (ISCAS), Florence, Italy, pp. 1-5 (Year: 2018).*

M. Wolf, "Ultralow Power and the New Era of Not-So-VLSI," Aug. 2016, in IEEE Design & Test, vol. 33, No. 4, pp. 109-113 (Year: 2016).*

J. Hu, J. Zhu and H. Li, "An Adiabatic Register File Based on Improved CAL Circuits Using Single-Phase Power Clock," 2010 International Conference on Innovative Computing and Communication and 2010 Asia-Pacific Conference on Information Technology and Ocean Engineering, Macao, China, 2010, pp. 286-289 (Year: 2010).*

US 8,582,756, 11/2013, IHP GmbH (withdrawn)

Arora S. et al., "A Pragmatic Review on Security and Integrity in Wireless Networks", International Journal on Recent and Innovation Trends in Computing and Communication 5(6):689-692 (Jun. 2017).

Fang X. et al., "Security Cost Aware Data Communication in Low-Power IoT Sensors With Energy Harvesting", Sensors 18:4400 (2018).

Fysarakis K. et al., "Embedded Systems Security Challenges", Proceedings of the 4th International Conference on Pervasive and Embedded Computing and Communication Systems pp. 255-266 (2014).

Khan M A et al., "IoT Security: Review, Blockchain Solutions, and Open Challenges", Future Generation Computer Systems 82:395-411 (2018).

Salman E. et al., "Leveraging RF Power for Intelligent Tag Networks", Special Session 3: Circuits and Systems for Autonomous IoT Devices, pp. 329-334 (May 23-25, 2018).

Wan T. et al., "AC Computing Methodology for RF-Powered IoT Devices", IEEE Transactions on Very Large Scale Integration (VLSI) Systems 274(5):1017-1028 (May 2019).

Wan T. et al., "Ultra Low Power SIMON Core for Lightweight Encryption", IEEE (2021).

International Search Report dated Jun. 23, 2020 issued in PCT/US2020/022522.

Gulcan et al., "A flexible and compact hardware architecture for the SIMON block cipher", International Workshop on Lightweight Cryptography for Security and Privacy (Mar. 17, 2015), retrieved on May 11, 2020 (May 11, 2020) from <URL: https://www.academia.edu/12400961/A_Flexible_and_Compact_Hardware_Architecture_for_the_SIMON_Block_Cipher> entire document.

* cited by examiner

ULTRA LOW POWER CORE FOR LIGHTWEIGHT ENCRYPTION

CROSS REFERENCE TO RELATED APPLICATION

This application claims the benefits of U.S. Provisional Patent Application Ser. No. 62/817,631, filed Mar. 13, 2019, the entire contents and disclosure of which are hereby incorporated herein by reference.

STATEMENT OF GOVERNMENT INTEREST

This invention was made with government support under 1646318 awarded by the National Science Foundation. The government has certain rights in this invention.

BACKGROUND

This invention generally relates to lightweight encryption, and more specifically, to an ultra low power core for lightweight encryption.

Ubiquitous (also referred to as pervasive) computing is an emerging paradigm interfacing the worldwide cyber network with the everyday physical realm. The massive integration of sensing, computing, and communication is expected to have significant impact on many areas such as transportation, healthcare, smart environment, and social relationships.

A major challenge to enable pervasive computing, such as widespread adoption of Internet-of-Things (IoT) devices, is security. In an environment where billions of small objects collect information and interact with each other, all of these communications should be secured to protect the exchanged data, user information, and the control of the devices.

The majority of the IoT devices are characterized by a lack of sufficient resources in terms of computing ability. Form factor and cost also play an important role, further limiting the overall capability of these devices.

SUMMARY OF THE INVENTION

Embodiments of the invention provide a processing unit and a method of operating a processing unit. In an embodiment, the processing unit comprises a SIMON block cipher for transforming plaintext input data into encrypted output data using one or more encryption keys, including a key expansion module and a round function module. The key expansion module is for generating and outputting the one or more encryption keys; and the key expansion module includes a first series of adiabatic registers for holding key generation data values, and for using adiabatic switching to transmit the key generation data values through the first series of adiabatic registers to generate the one or more encryption keys. The round function module is for receiving the plaintext input data and the one or more encryption keys, for encrypting the plaintext input data, in one or more rounds using the one or more encryption keys, to generate the encrypted data, and for outputting the encrypted data; and the round function module includes a second series of adiabatic registers for holding encryption data, and for using adiabatic switching to transmit the encryption data through the second series of adiabatic registers to generate the encrypted output data.

In an embodiment the key expansion module further includes one or more multiplexors for inputting selected data values to one or more of the registers of the first series of registers, each of the multiplexors is merged with a respective one of the registers of the first series of registers to form a merged block with said respective one of the registers, and the key expansion module generates and outputs the one or more encryption keys over a period of time comprising a sequence of clock cycles. In this embodiment, in each of the merged blocks, the multiplexor and the register of the each merged block operate in a same one of the clock cycles to input a selected one of the data values from the multiplexor to the register, to hold the selected one of the data values in the register, and to output the selected one of the data values from the register to another one of the registers in the first series of registers.

In an embodiment, the round function module further includes one or more multiplexors for inputting selected data values to one or more of the registers of the second series of registers, each of the multiplexors is merged with a respective one of the registers of the second series of registers to form a merged block with said respective one of the registers, and the round function module generates and outputs the encrypted output data over a period of time comprising a sequence of clock cycles. In this embodiment, in each of the merged blocks, the multiplexor and the register of the each merged block operate in a same one of the clock cycles to input a selected one of the data values from the multiplexor to the register, to hold the selected one of the data values in the register, and to output the selected one of the data values from the register to another one of the registers in the second series of registers.

In an embodiment, the key expansion module further includes a set of balanced transfer path adiabatic registers to balance the timing of the generation of the one or more encryption keys with the timing of the outputting of the one or more encryption keys.

In an embodiment, the round function module further includes a set of balanced transfer path adiabatic registers to balance the timing of the generation of the encrypted data with the timing of the outputting of the encrypted data.

In an embodiment, the invention provides a method of operating a SIMON block cipher for transforming plaintext input data into encrypted output data using one or more encryption keys. The method comprises in a key expansion module, generating and outputting the one or more encryption keys, including operating a first series of adiabatic registers for holding key generation data values, and using adiabatic switching to transmit the key generation data values through the first series of adiabatic registers to generate the one or more encryption keys; and in a round function module, receiving the plaintext input data and the one or more encryption keys, encrypting the plaintext input data, in one or more rounds using the one or more encryption keys, to generate the encrypted data, and outputting the encrypted data, including operating a second series of adiabatic registers for holding encryption data, and using adiabatic switching to transmit the encryption data through the second series of adiabatic registers to generate the encrypted output data.

In an embodiment, the invention provides a processor core for executing a FIFO-based bit-serial adiabatic implementation of a SIMON block cipher to transform plaintext input data into encrypted output data using one or more encryption keys. The processor core comprises a key expansion module and a round function module. The key expansion module is for generating and outputting the one or more encryption keys; and the key expansion module includes a first series of FIFO bit registers for holding key generation data values, and for using adiabatic switching to transmit the key generation data values through the first series of FIFO registers to generate the one or more encryption keys, and a first set of balanced transfer path adiabatic registers to balance the generation of the one or more encryption keys with the outputting of the one or more encryption keys. The round function module is for receiving the plaintext input data and the one or more encryption keys, for encrypting the plaintext input data, in one or more rounds using the one or more encryption keys, to generate the encrypted data, and for outputting the encrypted data. The round function module includes a second series of FIFO bit registers for holding encryption data, and for using adiabatic switching to transmit the encryption data through the second series of adiabatic registers to generate the encrypted output data, and a second set of balanced transfer path adiabatic registers to balance the timing of the generation of the encrypted data with the timing of the outputting of the encrypted data.

Embodiments of the invention provide an ultra low power hardware implementation of a SIMON block cipher. Adiabatic switching is leveraged in a bit-serialized SIMON core with 32-bit plaintext and 64-bit key. In an embodiment of the invention, 27.5 times higher energy efficiency (kilobit per second per Watt) is achieved at the expense of 18% less throughput as compared to conventional implementations.

DETAILED DESCRIPTION

Security is a significant challenge for a variety of emerging applications within pervasive computing such as the deployment of IoT devices at a massive scale. Conventional approaches such as advanced encryption standard (AES), though secure and robust, are not suitable for ensuring the integrity of data traveling among resource-constrained devices. Alternatively, lightweight cryptography algorithms, such as SIMON, are promising candidates for IoT devices since tradeoffs among security level, area, and performance are permitted.

Embodiments of the invention address this critical security challenge and provide an ultra low power, bit serialized SIMON core leveraging adiabatic switching.

Embodiments of the invention provide specific features to ensure correct operation with adiabatic switching. These features include use of adiabatic registers, merging multiplexer and FIFOs to ensure correct synchronization, elimination of the additional flip-flops (that exist in traditional implementations) for appending bits in circular shift operation, and introduction of balanced transfer paths for compensating additional clock phases that are required in adiabatic computation paths.

Figure 1:
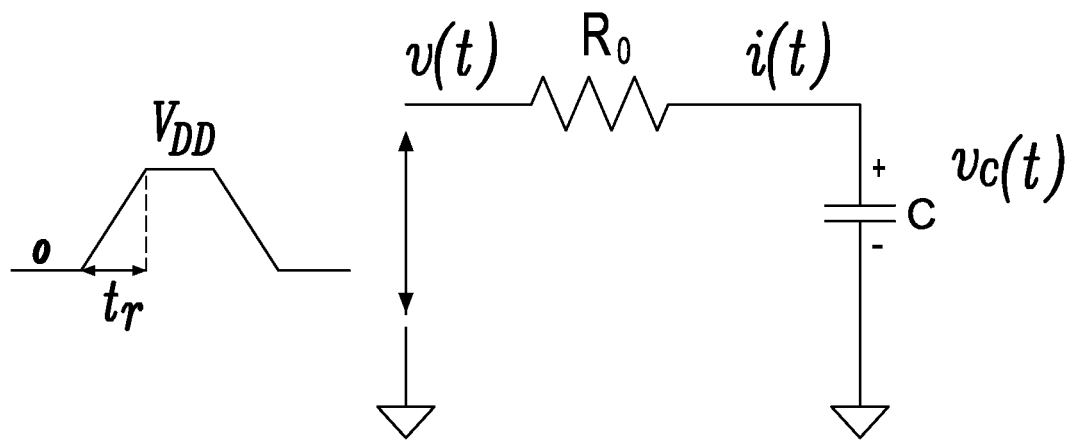
FIG. 1 is a diagram of an equivalent RC circuit to determine the energy loss in adiabatic logic.

FIG. 1 shows the equivalent circuit for an adiabatic logic gate, where C is the load capacitance and R is the on-resistance of transistors along the charging path. Contrary to conventional static logic, the transition is achieved by using a time-varying voltage source instead of a DC power supply. Assuming that the transition time is sufficiently slow, $v_c(t)$ follows input signal $v(t)$ [$v_c(t) \approx v(t)$]. The charging current is, $$i(t) = C\frac{dv(t)}{dt} = \frac{CV_{DD}}{t_r}. \quad (1)$$

The energy for a charging event is determined by integrating the instantaneous power p(t) during the transition time $t_r$, $$E = \int_0^T [v_R(t) + v_C(t)]dt = \frac{RC}{t_r}CV_{DD}^2. \quad (2)$$

A complete cycle comprises charging and recovering. As the recovery process dissipates the same amount of energy, the overall dissipation in adiabatic logic is, $$E_{AL} = 2\frac{RC}{t_r}CV_{DD}^2. \quad (3)$$

Figure 2:
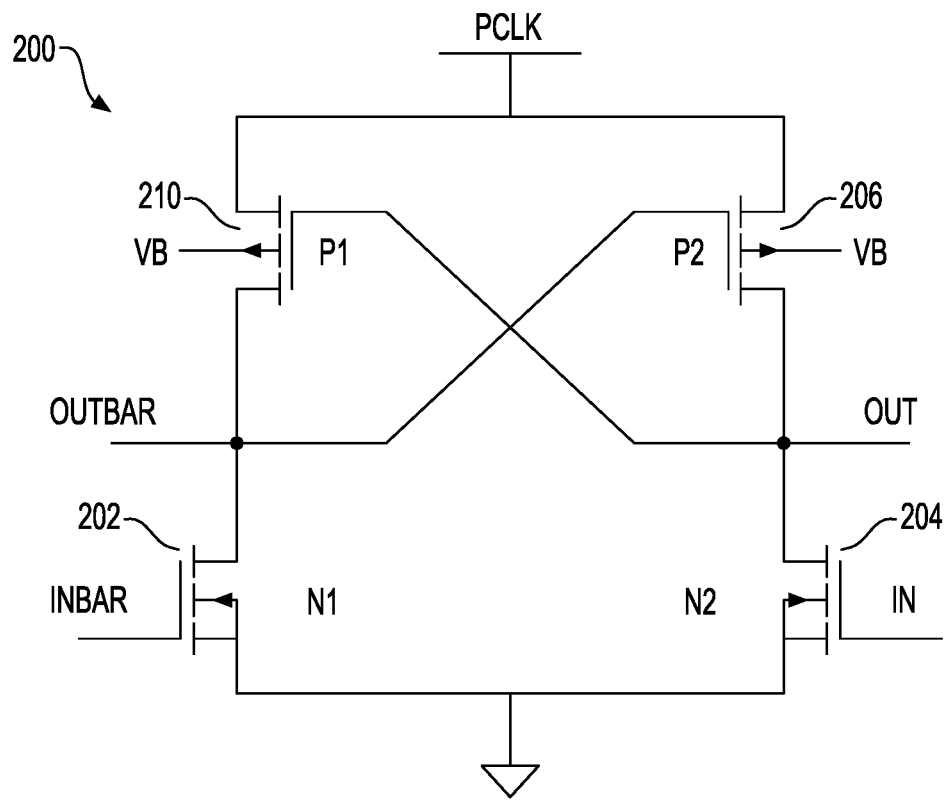
FIG. 2 is a schematic diagram of an adiabatic inverter in efficient charge recovery logic (ECRL).
Figure 3:
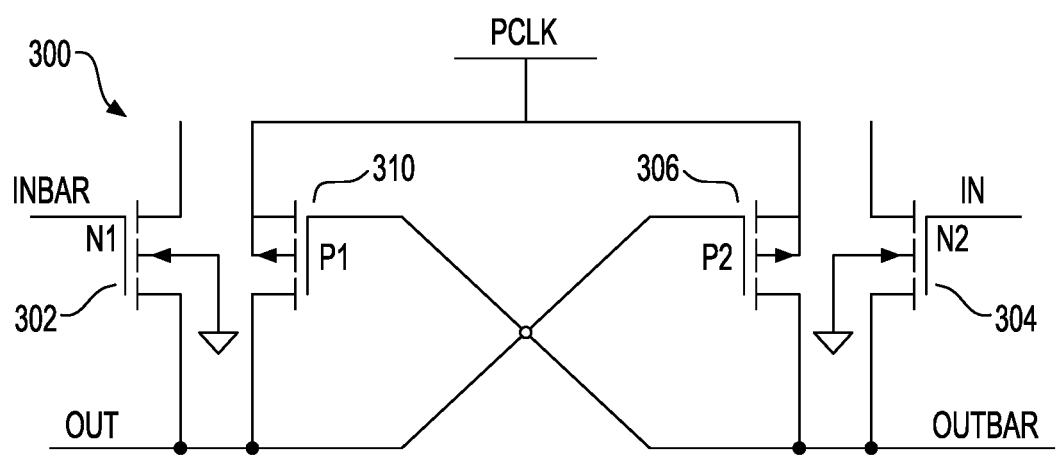
FIG. 3 is a schematic diagram of an adiabatic inverter in pass transistor adiabatic logic (PAL).

Thus, energy dissipation is scaled by the transition time $t_r$. Note that the RC parameter scales approximately quadratically with technology. Thus, in nanoscale technologies (where the RC is in the low picoseconds range), adiabatic switching can provide considerable power savings, even at the gigahertz frequencies. Interest on adiabatic charge-recycling logic has recently grown due to interoperability with energy harvesting IoT devices and RFIDs. Two types of adiabatic logic are considered to implement the SIMON block cipher, as depicted in FIGS. 2 and 3. The first type is efficient charge recovery logic (ECRL) 200 comprising nMOS complementary functional blocks (f and f) 02, 204, and a pair of crosscoupled pMOS transistors 206, 210. The operation of ECRL requires a four-phase AC signal, also referred to as power-clock signal (PCLK). The second type is pass-transistor adiabatic logic (PAL) 300. PAL comprises a pair of nMOS transistors 302, 304 and a pair of cross-coupled pMOS transistors 306, 310. In PAL, nMOS transistors 302, 304 are connected to power-clock signal instead of ground, thereby achieving full charge-recovery. This logic requires a two-phase power-clock signal. Both ECRL and PAL are inherently pipelined due to multi-phase power-clock signals.

SIMON Block Cipher

SIMON is a Feistel network based lightweight block cipher published by NSA, targeting highly resource-constrained applications. It provides a flexible level of security in ten configurations optimized for different block size 2n and key size mn, where n is the word size and m is the number of keys. Embodiments of the invention focus on SIMON32/64, which encrypts 32-bit plaintext with a 64-bit key in 32 rounds (m=4, n=16).

Figure 4:
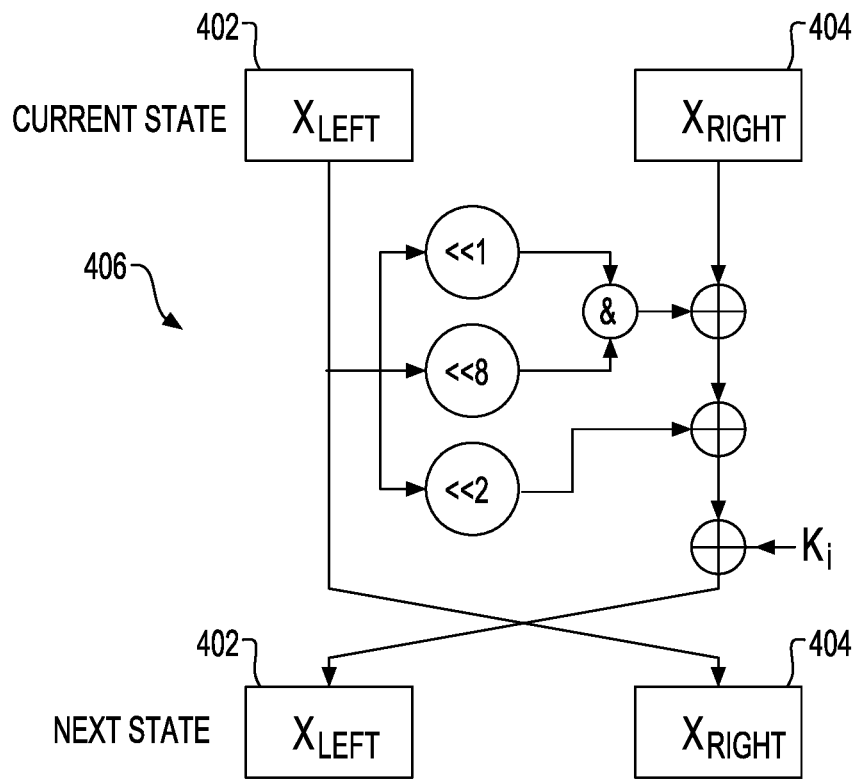
FIG. 4 shows the structure of SIMON round function.

The basic operation of the round function for all configurations of SIMON is depicted in FIG. 4. The memory element is split into two equal-sized word blocks, denoted by $X_{Left}$, 402 and) (right 404, respectively. These two word blocks hold the initial input plaintext and the output ciphertext after each encryption round. The round function, represented at 406, is constructed by bitwise AND, bitwise XOR, and circular shift operations. In each round, $X_{Left}$ performs the circular shift and bitwise boolean operations to compute the new ciphertext, which is written back to the same memory elements. Simultaneously, the current bits in $X_{Left}$ are transferred to) $X_{right}$. After a certain number of rounds, the repeated operation ends to generate the final ciphertext with a desired level of security.

Figure 5:
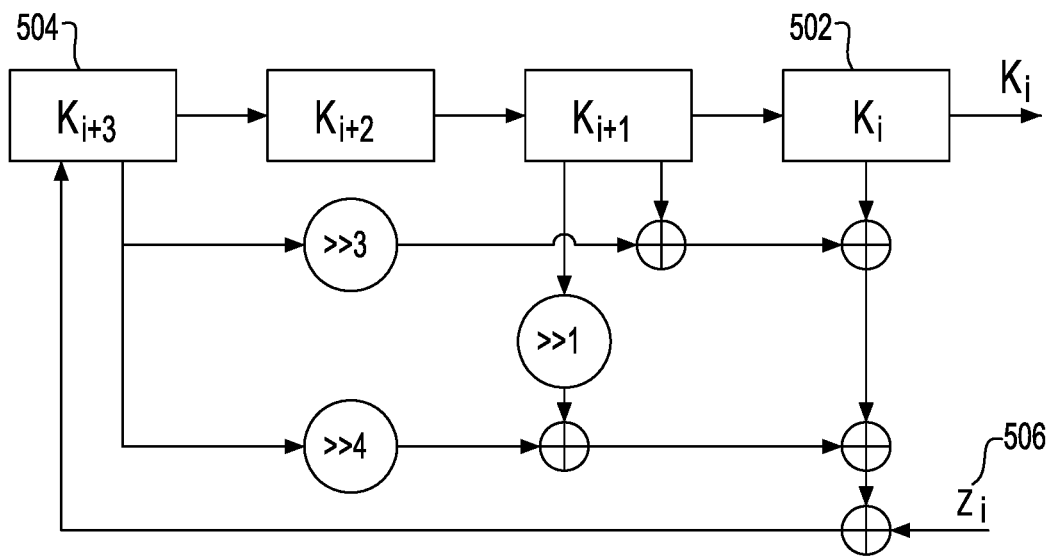
FIG. 5 shows the structure of SIMON key expansion function for four keys.

SIMON block cipher encrypts information in each round with a unique key generated by a key expansion module. Unlike the round function, the key scheduling configurations slightly vary depending upon the number of key words m, which can be 2, 3, or 4. In embodiments of the invention, the key expansion of SIMON32/64 has the configuration with m=4, as illustrated in FIG. 5. $K_i$ in the figure holds the key for the current round. The recently generated key is written back to the uppermost key block $K_{i+3}$, and all keywords are shifted one block right. Also, the SIMON key expansion employs a sequence of single-bit round constants $z_i$ 506 (see FIG. 5) to eliminate slide properties and circular shift symmetries, thereby introducing randomness.

When designing a block cipher, parallelism can be achieved at different levels such as bit level, round level, and encryption level. In embodiments of the invention, the lowest parallelism level of one bit, one round, and one encryption engine, also known as the bit-serial architecture, is adopted considering highly resource-constrained IoT devices.

In existing FIFO-based bit-serial SIMON architectures, both the key expansion and round functions have two phases: compute and transfer. During the compute phase, necessary bits are fetched from the current state, and the resulting bits of next state are written back to the same memory block after performing the encryption operations. Simultaneously, the transfer phase copies the contents of the left word blocks into the right word block for the next state.

Figure 6:
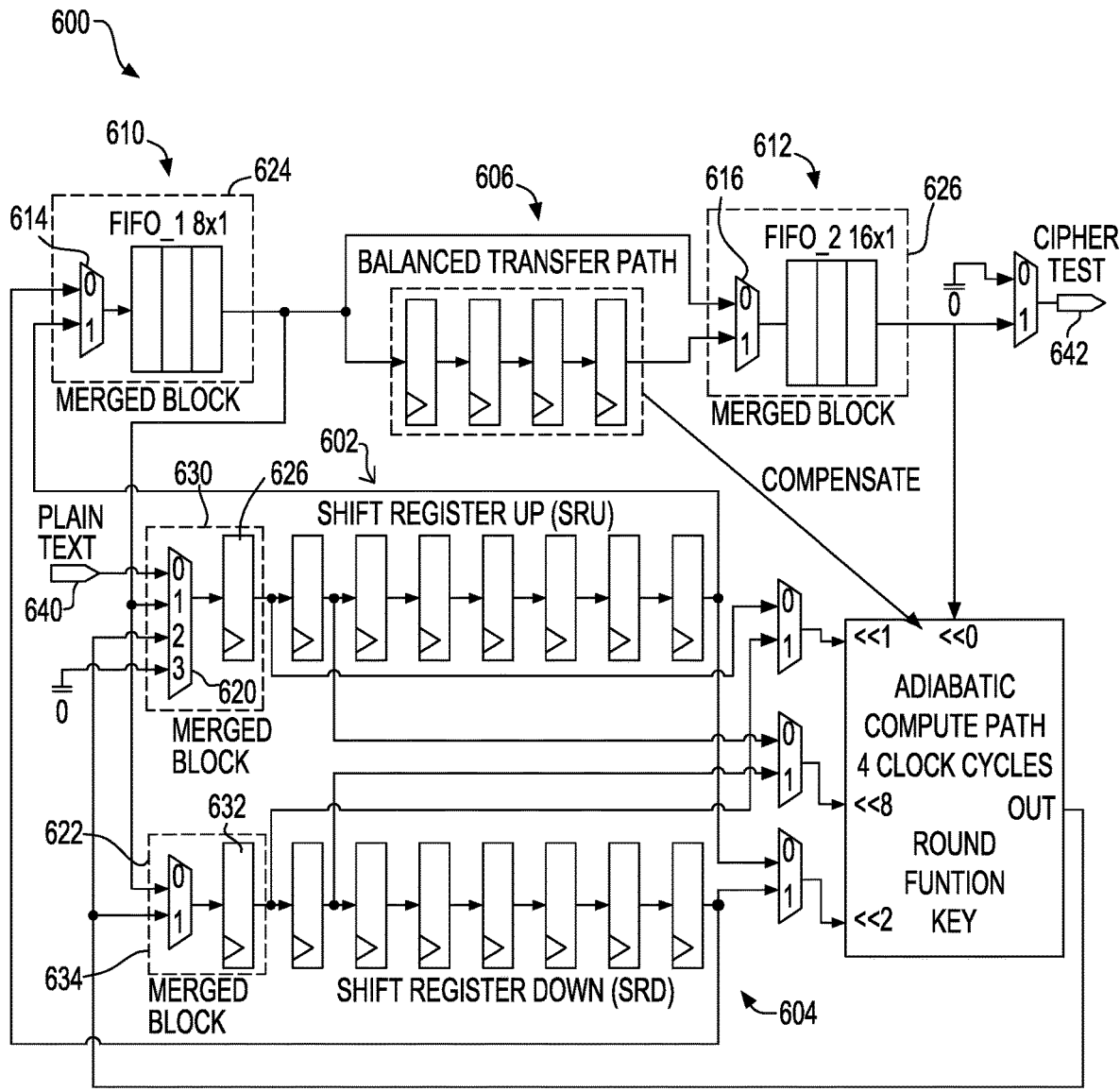
FIG. 6 illustrates an adiabatic architecture, in accordance with an embodiment of the invention, for round function of the bit serialized SIMON32/64 cipher.
Figure 7:
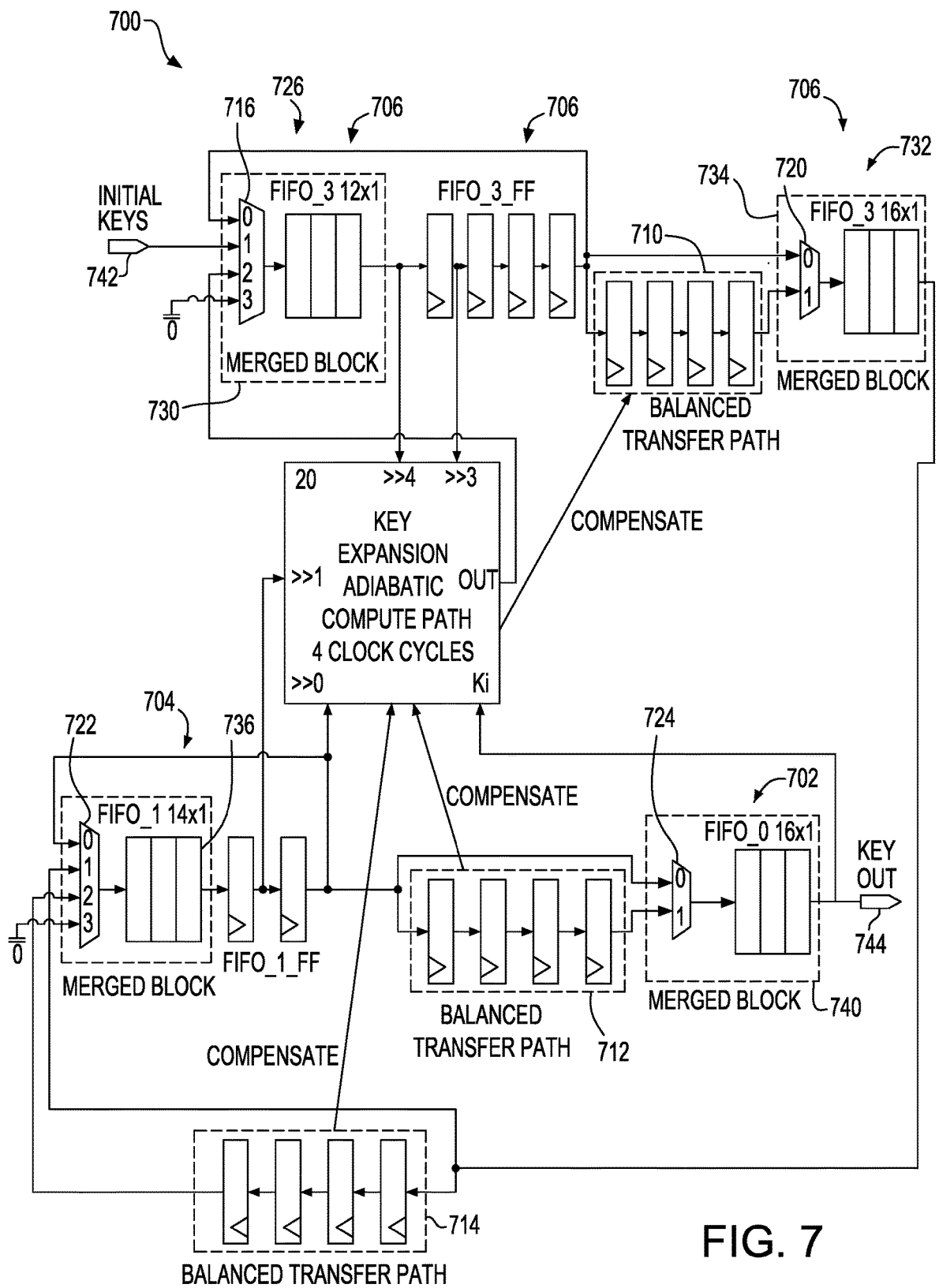
FIG. 7 illustrates an adiabatic architecture, in accordance with an embodiment of the invention, for key expansion of the bit serialized SIMON32/64 cipher.

In embodiments of the invention, since adiabatic logic is inherently pipelined, additional clock phases are introduced within combinational logic. With reference to FIGS. 6 and 7, to guarantee proper functionality, the conventional SIMON block cipher architecture is modified for, respectively, round and key expansion functions.

FIG. 6 shows an adiabatic architecture 600 in accordance with an embodiment of the invention, for the round function of the bit serialized SIMON32/64 cipher. Generally, architecture 600 comprises a series of Shift Register Up (SRU) 602, a series of Shift Register Down (SRD) 604, and a group of Balanced Transfer Path registers 606. Architecture 600 further comprises a plurality of group of FIFOs including FIFO_1, 610, and group of FIFO_2 612; and a plurality of multiplexors including multiplexors 614, 616, 620 and 622. In the embodiment of FIG. 6, FIFO_1 610 are merged with multiplexor 614 to form merged block 624, FIFO_2 are merged with multiplexor 616 to form merged block 626, FIF630 is merged with multiplexor 620 to form merged block 630, and FIFO 632 is merged with multiplexor 622 to form merged block 634.

Generally, in the operation of architecture 600, plaintext is input at 640, the plaintext is encrypted in the manner described above, and the ciphertext is output at 642.

FIG. 7 shows an adiabatic architecture 700, in accordance with an embodiment of the invention, for key expansion of the bit serialized SIMON32/64 cipher. Generally, architecture 700 comprises a plurality of groups of FIFOs including FIFO_0 702, FIFO_1 704 and FIFO_3 706, a plurality of groups of Balanced Transfer Path registers including groups 710, 712 and 714, and a plurality of multiplexors including multiplexors 716, 720, 722 and 724. In the embodiment of FIG. 7, a subgroup 726 of the FIFO_3 are merged with multiplexor 716 to form merged block 730, and another subgroup 732 of the FIFO_3 are merged with multiplexor 720 to form merged block 734. Also, the FIFO_1 are merged with multiplexor 722 to form merged block 736, and the FIFO_0 702 are merged with multiplexor 724 to form merged block 740.

Generally, in the operation of architecture 700, one or more initial keys are input at 742, one or more keys are generated in the manner described above, and the generated key or keys are output at 744.

Adiabatic Registers

In the architecture of FIGS. 6 and 7, the FIFO-based bit-serial implementation uses conventional registers as the memory elements. Due to the multi-phase operation of selected adiabatic logic, a certain number of inverters are cascaded to realize the function of registers for data synchronization. In the case of ECRL and PAL implementation, each register comprises four and two inverters, respectively. An enable signal can deactivate the register when the input data should not be latched.

Merged Blocks

Also, as illustrated in FIGS. 6 and 7, in embodiments of the invention, the multiplexors are merged with the FIFO blocks, referred to as merged blocks, to ensure that the operation is completed in one clock cycle. As an example, assume that the round function is running the first round in FIG. 6. The output of FIFO_1 is an input for the 4-to-1 multiplexer 620. Shift register up (SRU) and FIFO_1 store the $X_{Left}$ 16-bit word block in the current state. When the MSB of $X_{Left}$ is shifted right by one bit, the LSB in FIFO_1 should be ready for the computation of the next bit. To achieve this and maintain the consecutiveness of bitwise computation, multiplexer 620 is merged with the first register 626 of FIFO. Otherwise, the LSB in FIFO_1 would only arrive to the output of the multiplexer since an adiabatic multiplexor introduces one clock phase.

Compute and Transfer Paths

In the conventional architecture, a set of four flip-flops, labeled as LUT_FF, is used at the output of key expansion for storing and appending the least significant four bits into the most significant four bits without any conflict. Thus, the FIFO_3 732 can store the output bits of key expansion, only after the first four clock cycles. Alternatively, the adiabatic operation automatically introduces additional clock phases due to combinational logic within key expansion. Thus, the output bits are automatically buffered, as illustrated in FIG. 7. As such, in embodiments of the invention, the need to activate/deactivate LUT_FF for storing and appending the least significant four bits into the most significant four bits is eliminated. Thus, the key expansion block is specifically designed with a logic depth of 4 clock cycles in adiabatic logic. The logic depth is determined by the largest number of circular shift bits, which is 4 in SIMON key scheduling. As a result, the adiabatic compute path produces a conflict along the transfer path. It takes 20 cycles to generate the new round key, but it only takes 16 cycles to transfer. Thus, a set of 4 adiabatic registers 606 with a multiplexor, 616 depicted in FIG. 6, are added as balanced transfer path. The same technique is used for the key expansion, as shown in FIG. 7.

The adiabatic (both ECRL and PAL) bit-serialized SIMON32/64 cipher described herein is designed using 65 cm CMOS technology. A static CMOS based bit-serialized SIMON32/64 cipher is also designed in the same technology for comparison. CRL and PAL based cipher circuits are supplied with a sinusoidal signal with an amplitude of 1.2 V as the power-clock signal whereas the conventional logic is powered with a DC source of 1.2 V. All of the circuits operate at 13.56 MHz. the standard frequency for silicon based item-level RF identification.

In embodiments of the modules shown in FIGS. 6 and 7, all cells (both combinational and sequential) are adiabatic for correct synchronization. Embodiments of the invention show that an adiabatic buffer/inverter can be used as a register in a SIMON block cipher, and use four adiabatic buffers/inverters to develop an adiabatic register that consumes one clock cycle.

Also, in embodiments of the invention, the multiplexors are adiabatic as well. In the conventional case, the multiplexors are usually implemented using a circuit structure referred to as transmission gates. In embodiments of the invention, because the multiplexors are adiabatic, the multiplexors are implemented by using other adiabatic cells rather than transmission gates.

Embodiments of the invention operate using ultra low power alternating current (AC) and may use a wirelessly harvested SC signal to drive the data processing circuits. Any suitable method and system may be used to harness the AC signal and to provide the AC signal to the block cipher processing circuits. For example, suitable methods and systems are disclosed in WO 2017/192849 titled "Radio Frequency Energy Harvesting Apparatus and Method For Utilizing The Same," the entire contents and disclosure of which are hereby incorporated herein by reference.

Figure 8:
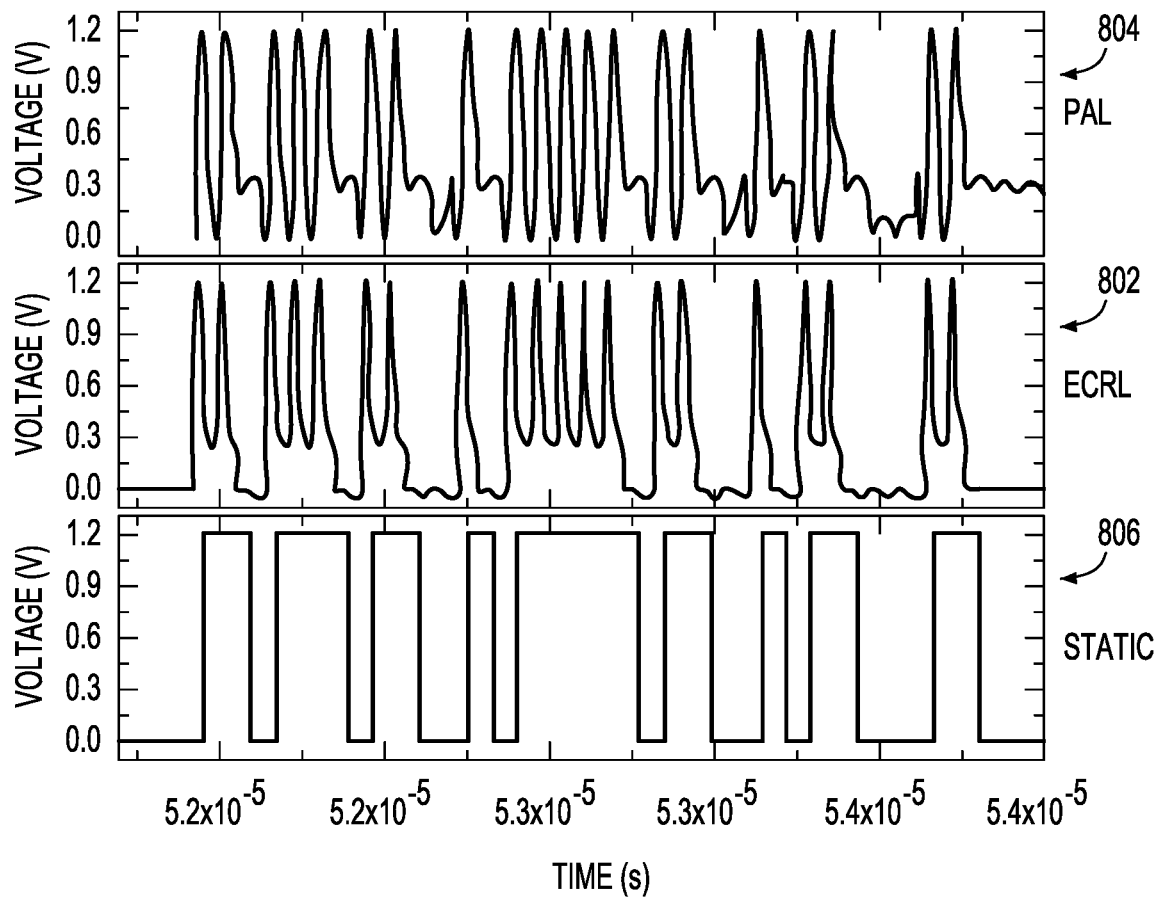
FIG. 8 shows simulated output waveforms for a software simulation of the SIMON32/64 cipher blocks in accordance with an embodiment of the invention.

To verify the correct operation, a software implementation of SIMON32/64, of an embodiment of the invention, is also developed. The test vectors are comprised of initial keys 16'h 1918 1110 0908 0100 and plaintext 8'h 6565 6877. The correct output bit sequence of 8'h c6 9b e9bb is obtained in both adiabatic (ECRL and PAL) and conventional static CMOS based implementations. The corresponding simulated output waveforms for each implementation are shown in FIG. 8 at 802, 804 and 806 respectively, demonstrating the correct encryption operation.

The simulation results comparing an embodiment of the invention with the conventional approach are listed in Table I where average power, latency, energy to encrypt 32-bit plaintext throughput, energy efficiency (kb/sec/μ,W), and number of transistors are listed.

TABLE I

PERFORMANCE OF THE BIT-SERIALIZED
SIMON32/64 CIPHER IMPLEMENTED IN
PROPOSED AND CONVENTIONAL APPROACHES

| Architecture | Conventional | Proposed | |
|---|---|---|---|
| Logic | Static Logic | ECRL | PAL |
| Average Power (μW) | 9.12 | 0.91 | 0.27 |
| Latency (Clock Cycles) | 576 | 704 | 704 |

TABLE I-continued

PERFORMANCE OF THE BIT-SERIALIZED
SIMON32/64 CIPHER IMPLEMENTED IN
PROPOSED AND CONVENTIONAL APPROACHES

| Architecture | Conventional | Proposed | |
|---|---|---|---|
| Energy (pJ) | 387 | 47 | 14 |
| Throughput (Kbps) | 753 | 616 | 616 |
| Efficiency (Kb/sec/μ W) | 83 | 677 | 2281 |
| Transistor (#) | 2966 | 2258 | 1242 |

Note that all of the transistors in each implementation have minimum size. According to these results, the energy of the encryption operation is reduced by up to 27.6 times at the expense of 1.2 times reduction in throughput. The average power consumption is reduced by up to 34 times. Furthermore, the overall number of transistors is reduced by up to 2.4 times. Note that if the process of DC-to-AC conversion (required to produce power-clock signals in adiabatic logic) is considered, the energy efficiency can still be improved by up to 16.3 times (assuming a conversion efficiency of 41%).

The operation of the encryption and key generation functions of the SIMON Block Cipher, in embodiments of the invention, are described in more detail with reference to FIGS. 9-11.

Figure 9:
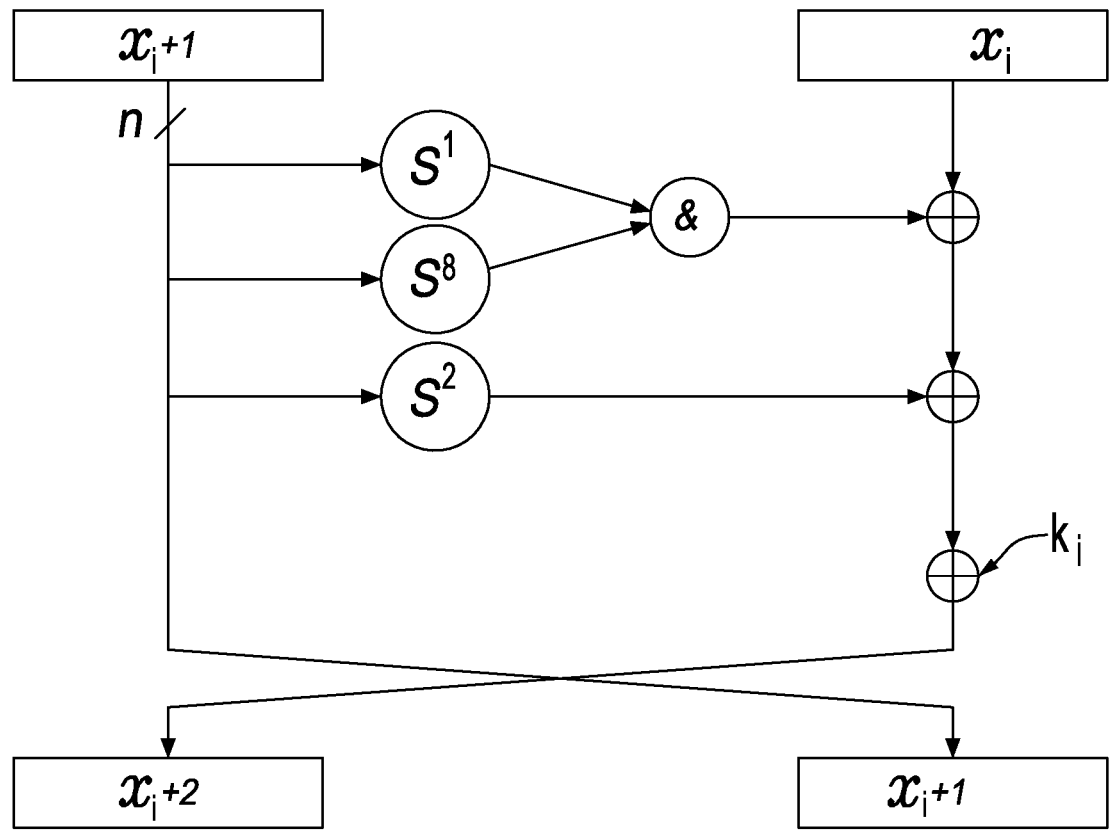
FIG. 9 illustrates a Feistel map for a SIMON block cipher.
Figure 10:
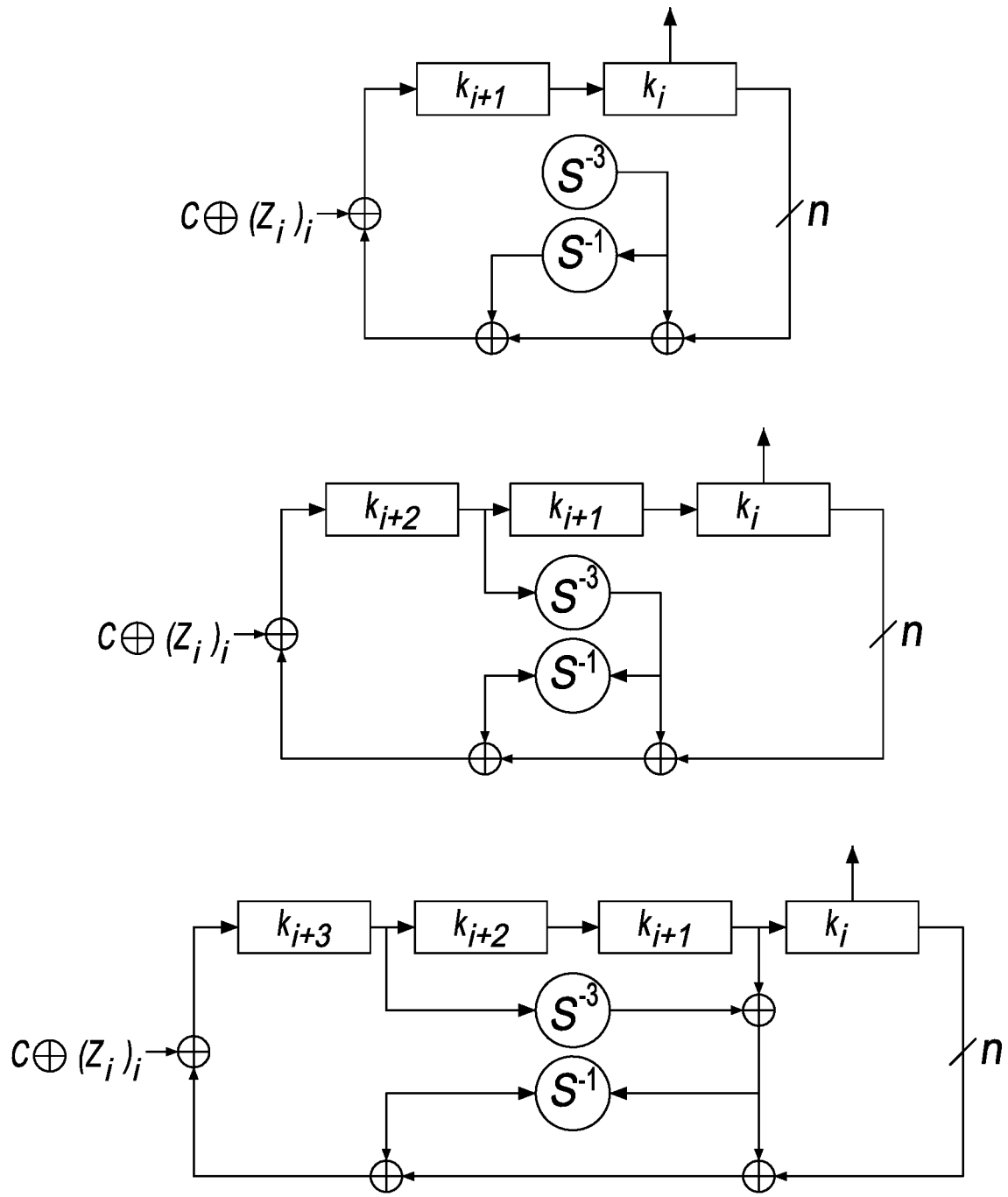
FIG. 10 shows key expansion for a given iteration for a SIMON block cipher.

The transformation of the cipher module may be illustrated in the Feistel map shown in FIG. 9. The transformation as shown in the Feistel map may be expressed as $$R_k(x,y)=(y \oplus f(x) \oplus k, x)$$

where $$f(x)=(Sx \,\&\, S8x) \oplus S2x$$

and k is the round key, specific to a given round. In FIG. 9, y may be expressed as $x_{i+1}$. These transformations may include the encryption operations for the cipher module. Furthermore, the inverse of the round function is used for decryption, given as $$R^{-1}{}_k(x,y)=(y, x \oplus f(y) \oplus k)$$

The round key or subkey may be based upon the parameter key as manipulated by a key schedule. The key schedule used by the cipher module may include a number of possible rounds R before the subkey repeats. Furthermore, the key schedule used by the cipher module may depend upon the block size, key size, and word size used for its parameters. The key schedule used by the cipher module may include a sequence of one-bit round constants that may help eliminate slide properties and circular shift symmetries.

Furthermore, the cipher module may include any suitable number of key expansions, by which keys for a given round are manipulated based on previous round key values. Such key expansions may provide additional protection against slide properties and other shortcomings. FIG. 10 illustrates key expansion for a given iteration i of the cipher module. The output codeword c, the selected key schedule constant $z_j$ and previous subkeys $k_i$, $k_{i+1}$, $k_{1+2}$, or $k_{1+3}$ may be used. A key expansion of FIG. 10 may be chosen according to how many key words m are used in the transformation in the cipher module. The number of key words m may be selected according to the block size and key size used as input to the cipher module.

Figure 11:
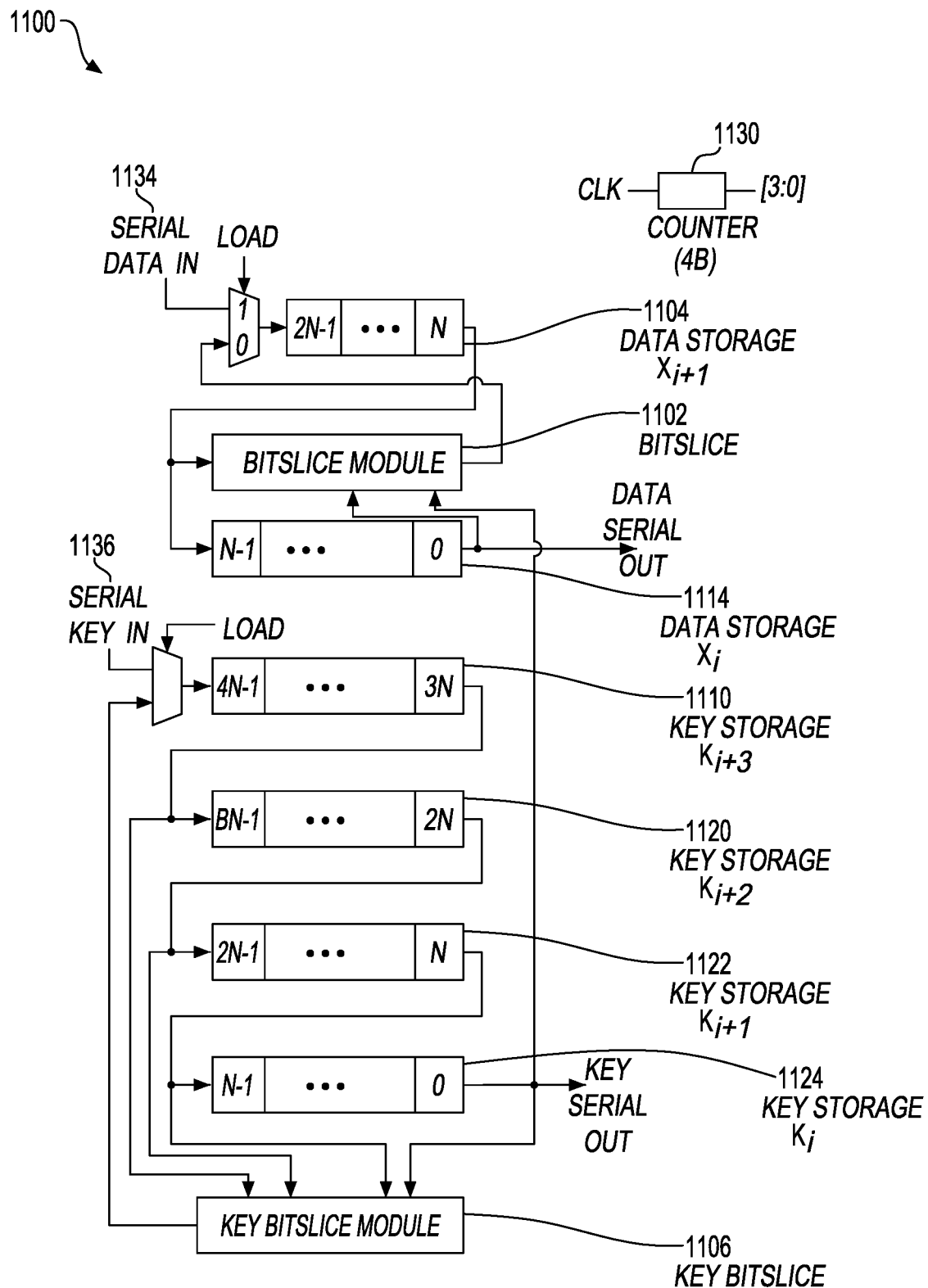
FIG. 11 is an illustration of an example embodiment of a SIMON block cipher module.

FIG. 11 is an illustration of an example embodiment of a cipher module 1100 for serial operation. In one embodiment, cipher module 1100 may apply a single bitslice computation per cycle to determine an output from its transformation logic. In another embodiment, cipher module 1100 may apply a single key generation per cycle.

Cipher module 1100 may employ a sixteen-bit word-size datapath, and in the cipher module, output of bitslice module 1102 may be written to the top of data storage $x_{i+1}$ 1104. Furthermore, output of key bitslice module 1106 may be written to the top of key storage $k_{i+3}$ 1110. During each cycle, data may be passed from high to low within a given storage 1104, 1114, 1110, 1120, 1122, 1124, 1106. Furthermore, when data is to exit the given storage, it may pass to a successive storage (i.e., i+3 to i+2, to i+1, to i).

In one embodiment, cipher module 1100 may include a counter 1130 to determine what position of a given word is being calculated. The size of the counter may depend on the size of the words used in the cipher module. In the example of FIG. 11, counter 1130 may include four bits to track the sixteen different positions of the storage in cipher module 1100. Cipher module 1100 may issue one round of transformed data every sixteen clock cycles.

Bitslice module 1102 may accept input in the form of individual bits taken from the bottom of data storage $x_{i+1}$ 1104, data storage $x_i$ 1114, and key storage $k_i$ 1124. Bitslice module 1102 may output individual bits which may be the output of cipher module 1100. Key bitslice module 1106 may accept input in the form of individual bits taken from the bottom of key storage $k_i$ 1124, key storage $k_{i+1}$ 1122, key storage $k_{i+3}$ 1110, and a z-module (not shown). The z-module may be implemented in any suitable manner. The output of key bitslice module 1106 may be serialized but applied to $k_{i+3}$. Input 1134 may be serialized, as may be the input key 1136.

As processed bits are written into a most-significant-bit position of a given storage, any word-size rotate operations (such as those used within key expansion or round calculations) that depend on unprocessed bits at those locations may have to accommodate for such unprocessed bits. Bitslice module 1102 and key bitslice module 1106 may use the bit counter value to multiplex between storage positions to account for unprocessed bits.

In one embodiment of bitslice module 1102, the output of shift operations as part of implementing the Feistel graph of FIG. 9 may be optionally held. These may be held if insufficient bit processing has been performed such that meaningful data would reside in the referenced locations. In one embodiment of key bitslice module 1106, the output of shift operations as part of implementing key expansion as shown in FIG. 10 may be similarly held. These may be held if insufficient bit processing has been performed to provide meaningful data.

In one embodiment, the operation of the output of the z-module may be held to match the serial operation elsewhere in block cipher 1100. For example, a clock of the z-module may be gated by the count of counter 1130 such that the constant that is output from the z-module remains the same until a full round of processing is completed.

Figure 12:
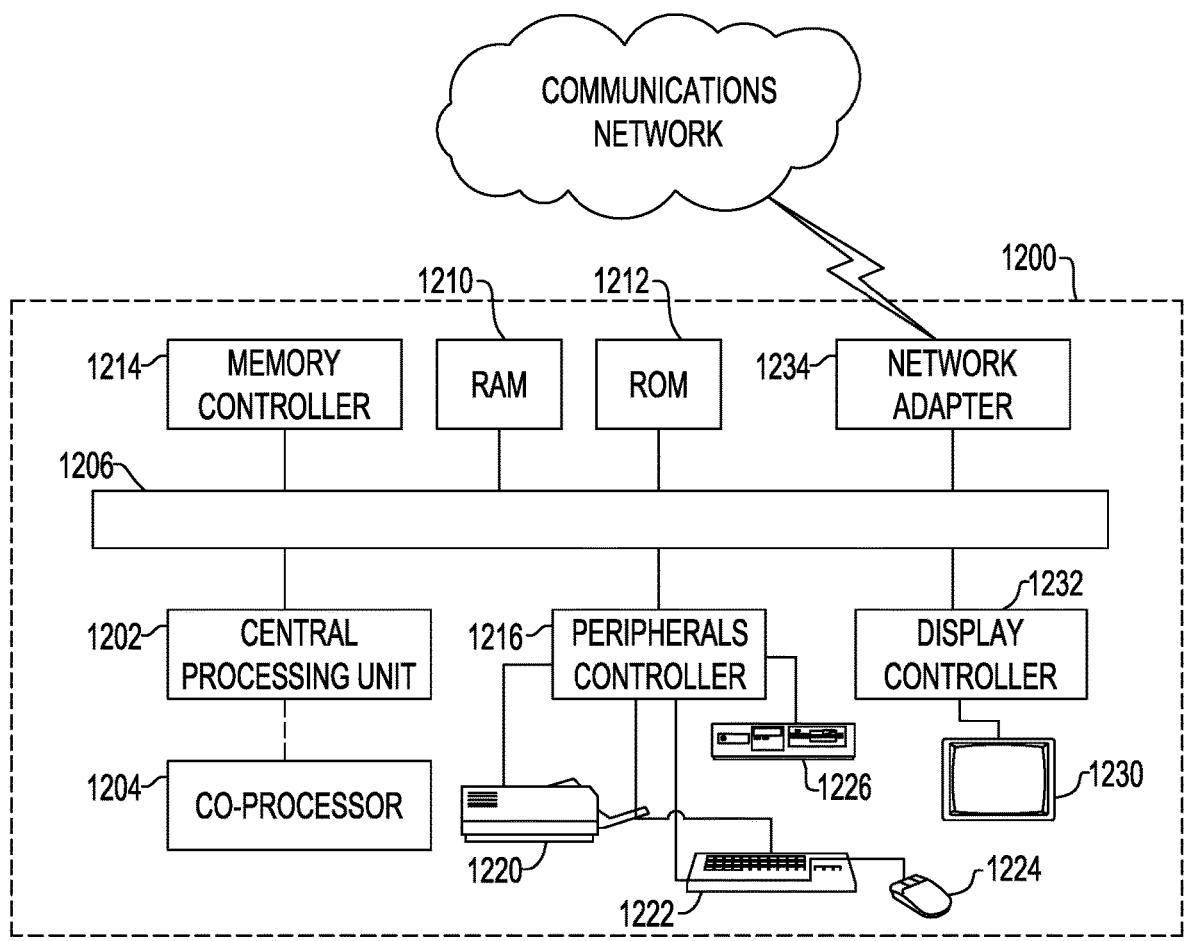
FIG. 12 is a block diagram of an exemplary processing system on which or with which embodiments of the invention may be implemented.

Embodiments of the invention may be used in or with any suitable processing system, unit, core, or circuit. FIG. 12 is a block diagram of an exemplary processing system 1200 on which, or with which, embodiments of the invention may be implemented. System 1200 may comprise a processing unit or computer and may be controlled primarily by computer readable instructions, which may be in the form of software, wherever, or by whatever means such software is stored or accessed. Such computer readable instructions may be executed within central processing unit (CPU) 1202 to cause system 90 to do work. In many known machines, central processing unit 1202 is implemented by a single-chip CPU called a microprocessor. In other machines, the central processing unit may comprise multiple processors. Coprocessor 1204 is an optional processor, distinct from main CPU 1202, that performs additional functions or assists CPU 1202.

In operation, CPU 1202 fetches, decodes, and executes instructions, and transfers information to and from other resources via the computer's main data-transfer path, system bus 1206. Such a system bus connects the components in system 1200 and defines the medium for data exchange. System bus 1206 typically includes data lines for sending data, address lines for sending addresses, and control lines for sending interrupts and for operating the system bus.

Memory devices coupled to system bus 1206 include random access memory (RAM) 1210 and read only memory (ROM) 1212. Such memories include circuitry that allows information to be stored and retrieved. ROMs 1212 generally contain stored data that cannot easily be modified. Data stored in RAM 1210 can be read or changed by CPU 1202 or other hardware devices. Access to RAM 1210 and/or ROM 1212 may be controlled by memory controller 1214. Memory controller 1214 may provide an address translation function that translates virtual addresses into physical addresses as instructions are executed. Memory controller 1214 may also provide a memory protection function that isolates processes within the system and isolates system processes from user processes.

In addition, system 1200 may contain peripherals controller 1216 responsible for communicating instructions from CPU 1202 to peripherals, such as printer 1220, keyboard 1222, mouse 1224, and disk drive 1226. Display 1230, which is controlled by display controller 1232, is used to display visual output generated by system 1200. Such visual output may include text, graphics, animated graphics, and video. Display 1230 may be implemented with a CRT-based video display, an LCD-based flat panel display, gas plasma-based flat-panel display, or a touch panel. Display controller 1232 includes electronic components required to generate a video signal that is sent to display 1230. Further, system 1200 may contain network adaptor 1234 that may be used to connect system 90 to an external communications network.

Embodiments of the invention provide an ultra low power, bit-serialized SIMON block cipher leveraging adiabatic theory. Simulation results of a SIMON block cipher with 32-bit plaintext and 64-bit key demonstrate that the energy efficiency (kilobit per second per Watt) is increased by 27.5 times at the expense of 18% less throughput. Furthermore, the number of transistors is reduced by up to 58%, demonstrating the applicability of embodiments of the invention to resource-constrained environments such as IoT devices.

While the invention has been shown and described with reference to certain embodiments of the present invention thereof, it will be understood by those skilled in the art that various changes in from and details may be made therein without departing from the spirit and scope of the present invention and equivalents thereof.

The invention claimed is:

1. A processing unit comprising:
 a SIMON block cipher for transforming plaintext input data into encrypted output data using one or more encryption keys, including
  a key expansion module for generating and outputting the one or more encryption keys, and including a first series of adiabatic registers for holding key generation data values, and for using adiabatic switching to transmit the key generation data values through the first series of adiabatic registers to generate the one or more encryption keys; and a round function module for receiving the plaintext input data and the one or more encryption keys, for encrypting the plaintext input data, in one or more rounds using the one or more encryption keys, to generate the encrypted data, and for outputting the encrypted data, and including a second series of adiabatic registers for holding encryption data, and for using adiabatic switching to transmit the encryption data through the second series of adiabatic registers to generate the encrypted output data.

2. The processing unit according to claim 1, wherein:

the key expansion module further includes one or more multiplexors for inputting selected data values to one or more of the registers of the first series of registers;

each of the multiplexors is merged with a respective one of the registers of the first series of registers to form a merged block with said respective one of the registers;

the key expansion module generates and outputs the one or more encryption keys over a period of time comprising a sequence of clock cycles; and in each of the merged blocks, the multiplexor and the register of the each merged block operate in a same one of the clock cycles to input a selected one of the data values from the multiplexor to the register, to hold the selected one of the data values in the register, and to output the selected one of the data values from the register to another one of the registers in the first series of registers.

3. The processing unit according to claim 2, wherein:

each of the clock cycles includes a plurality of phases; and in said same one of the clock cycles, the multiplexor of the each merged block operates in one of the plurality of phases of the same one of the clock cycles to input the selected one of the data values to the register of the each merged block, and the register of the merged block operates in another one of the plurality of phases of the same one of the clock cycles to output the selected one of the data values from the register to the another one of the registers of the first series of registers.

4. The processing unit according to claim 1, wherein:

the round function module further includes one or more multiplexors for inputting selected data values to one or more of the registers of the second series of registers;

each of the multiplexors is merged with a respective one of the registers of the second series of registers to form a merged block with said respective one of the registers;

the round function module generates and outputs the encrypted output data over a period of time comprising a sequence of clock cycles; and in each of the merged blocks, the multiplexor and the register of the each merged block operate in a same one of the clock cycles to input a selected one of the data values from the multiplexor to the register, to hold the selected one of the data values in the register, and to output the selected one of the data values from the register to another one of the registers in the second series of registers.

5. The processing unit according to claim 4, wherein:

each of the clock cycles includes a plurality of phases; and in said same one of the clock cycles, the multiplexor of the each merged block operates in one of the plurality of phases of the same one of the clock cycles to input the selected one of the data values to the register of the each merged block, and the register of the merged block operates in another one of the plurality of phases of the same one of the clock cycles to output the selected one of the data values from the register to the another one of the registers of the second series of registers.

6. The processing unit according to claim 1, wherein the key expansion module further includes a set of balanced transfer path adiabatic registers to balance the timing of the generation of the one or more encryption keys with the timing of the outputting of the one or more encryption keys.

7. The processing unit according to claim 6, wherein the set of balanced transfer path registers compensate for a portion of a length of time needed to generate each of the one or more encryption keys.

8. The processing unit according to claim 7, wherein:

the key expansion module generates each of the encryption keys in a first number of clock cycles in a key generation path, and outputs each of the encryption keys in a second number of clock cycles in a key transfer path; and the set of balanced transfer path adiabatic registers are in the key transfer path to balance the timing of the key transfer path with the timing of the key generation path.

9. The processing unit according to claim 7, wherein:

the round function module generates the encrypted data in a first number of clock cycles in a data encryption path, and outputs the encrypted data in a second number of clock cycles in an encrypted data transfer path; and the set of balanced transfer path adiabatic registers are in the encrypted data transfer path to balance the encrypted data transfer path with the data encryption path.

10. The processing unit according to claim 1, wherein the round function module further includes a set of balanced transfer path adiabatic registers to balance the timing of the generation of the encrypted data with the timing of the outputting of the encrypted data.

11. A method of operating a SIMON block cipher for transforming plaintext input data into encrypted output data using one or more encryption keys, the method comprising:

in a key expansion module, generating and outputting the one or more encryption keys, including operating a first series of adiabatic registers for holding key generation data values, and using adiabatic switching to transmit the key generation data values through the first series of adiabatic registers to generate the one or more encryption keys; and in a round function module, receiving the plaintext input data and the one or more encryption keys, encrypting the plaintext input data, in one or more rounds using the one or more encryption keys, to generate the encrypted data, and outputting the encrypted data, including operating a second series of adiabatic registers for holding encryption data, and using adiabatic switching to transmit the encryption data through the second series of adiabatic registers to generate the encrypted output data.

12. The method according to claim 11, wherein the key expansion module further includes one or more multiplexors for inputting selected data values to one or more of the registers of the first series of registers, each of the multiplexors is merged with a respective one of the registers of the first series of registers to form a merged block with said respective one of the registers, and the key expansion module generates and outputs the one or more encryption keys over a period of time comprising a sequence of clock cycles; and the method further comprises:

operating the multiplexor and the register of the each merged blocks in a same one of the clock cycles to input a selected one of the data values from the multiplexor to the register, to hold the selected one of the data values in the register, and to output the selected one of the data values from the register to another one of the registers in the first series of registers.

13. The method according to claim 11, wherein the round function module further includes one or more multiplexors for inputting selected data values to one or more of the registers of the second series of registers, each of the multiplexors is merged with a respective one of the registers of the second series of registers to form a merged block with said respective one of the registers, and the round function module generates and outputs the encrypted output data over a period of time comprising a sequence of clock cycles, and the method further comprises:

operating the multiplexor and the register of each of the merged blocks in a same one of the clock cycles to input a selected one of the data values from the multiplexor of said each of the merged blocks to the register of said each of the merged blocks, to hold the selected one of the data values in the register, and to output the selected one of the data values from the register to another one of the registers in the second series of registers.

14. The method according to claim 11, further comprising operating a set of balanced transfer path adiabatic registers to balance the timing of the generation of the one or more encryption keys with the timing of the outputting of the one or more encryption keys.

15. The method according to claim 11, further comprising operating a set of balanced transfer path adiabatic registers to balance the generation of the encrypted data with the outputting of the encrypted data.

16. A processor core for executing a FIFO-based bit-serial adiabatic implementation of a SIMON block cipher to transform plaintext input data into encrypted output data using one or more encryption keys, the processor core comprising:

a key expansion module for generating and outputting the one or more encryption keys, and including
  a first series of FIFO bit registers for holding key generation data values, and for using adiabatic switching to transmit the key generation data values through the first series of FIFO registers to generate the one or more encryption keys, and
  a first set of balanced transfer path adiabatic registers to balance the timing of the generation of the one or more encryption keys with the timing of the outputting of the one or more encryption keys; and a round function module for receiving the plaintext input data and the one or more encryption keys, for encrypting the plaintext input data, in one or more rounds using the one or more encryption keys, to generate the encrypted data, and for outputting the encrypted data, and including
  a second series of FIFO bit registers for holding encryption data, and for using adiabatic switching to transmit the encryption data through the second series of adiabatic registers to generate the encrypted output data, and
  a second set of balanced transfer path adiabatic registers to balance the timing of the generation of the encrypted data with the timing of the outputting of the encrypted data.

17. The processor core according to claim 16, wherein:
the key expansion module further includes one or more multiplexors for inputting selected data values to one or more of the FIFO registers of the first series of FIFO registers;
each of the multiplexors is merged with a respective one of the FIFO registers of the first series of FIFO registers to form a merged block with said respective one of the registers.

18. The processor core according to claim 17, wherein:
the key expansion module generates and outputs the one or more encryption keys over a period of time comprising a sequence of clock cycles; and
in each of the merged blocks, the multiplexor and the FIFO register of the each merged block operate in a same one of the clock cycles to input a selected one of the data values from the multiplexor to the register, to hold the selected one of the data values in the register, and to output the selected one of the data values from the register to another one of the registers in the first series of registers.

19. The processor core according to claim 16, wherein:
the round function module further includes one or more multiplexors for inputting selected data values to one or more of the FIFO registers of the second series of FIFO registers; and
each of the multiplexors is merged with a respective one of the FIFO registers of the second series of FIFO registers to form a merged block with said respective one of the registers.

20. The processor core according to claim 19, wherein:
the round function module generates and outputs the encrypted output data over a period of time comprising a sequence of clock cycles; and
in each of the merged blocks, the multiplexor and the FIFO register of the each merged block operate in a same one of the clock cycles to input a selected one of the data values from the multiplexor to the FIFO register, to hold the selected one of the data values in the FIFO register, and to output the selected one of the data values from the FIFO register to another one of the FIFO registers in the second series of FIFO registers.

* * * * *